(12) United States Patent
Wiegman et al.

(10) Patent No.: US 11,590,854 B1
(45) Date of Patent: Feb. 28, 2023

(54) SYSTEM AND METHOD FOR RECHARGING AN ELECTRIC VEHICLE

(71) Applicant: BETA AIR, LLC, South Burlington, VT (US)

(72) Inventors: Herman Wiegman, South Burlington, VT (US); Zach Pan, South Burlington, VT (US); Chenjie Lin, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/515,626

(22) Filed: Nov. 1, 2021

(51) Int. Cl.
*B60L 53/20* (2019.01)
*B60L 53/16* (2019.01)
*H02J 7/00* (2006.01)

(52) U.S. Cl.
CPC .............. *B60L 53/20* (2019.02); *B60L 53/16* (2019.02); *H02J 7/0042* (2013.01); *H02J 7/0047* (2013.01); *B60L 2200/10* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 10,771,001 B2 | 9/2020 | Smolenaers | |
| 10,875,414 B2 | 12/2020 | Partovi | |
| 2018/0309312 A1 | 10/2018 | King | |
| 2020/0062138 A1 | 2/2020 | Smolenaers | |
| 2020/0225684 A1 | 7/2020 | Anderson et al. | |
| 2020/0298722 A1 | 9/2020 | Smolenaers | |
| 2021/0203232 A1* | 7/2021 | Mihashi | B60L 15/20 |
| 2022/0029431 A1* | 1/2022 | McLean | B60L 50/66 |
| 2022/0126713 A1* | 4/2022 | Liu | B60L 53/20 |
| 2022/0278617 A1* | 9/2022 | Liu | H02M 3/1582 |

OTHER PUBLICATIONS

AERO-MAG, UAVs on a power trip, Jun. 11, 2021.

* cited by examiner

*Primary Examiner* — Jared Fureman
*Assistant Examiner* — Aqeel H Bukhari
(74) *Attorney, Agent, or Firm* — Caldwell Intellectual Property Law

(57) ABSTRACT

In an aspect, a system for recharging an electric vehicle. A system includes an electric vehicle. An electric vehicle includes at least a propulsor. An electric vehicle includes a recharging connector electrically connected to a power source. An electric vehicle includes a power storage unit. A power storage unit is configured to store power. An electric vehicle includes a power supply circuit. A power supply circuit is in electric communication with a power storage unit and recharging connector. A power supply circuit includes a buck-boost regulator. A buck-boost regulator includes at least an inductor. A buck-boost regulator includes a switching device to supply intermittent current to at least an inductor. At least one of at least an inductor and a switching device is a component of at least a propulsor motor.

20 Claims, 8 Drawing Sheets

SYSTEM AND METHOD FOR RECHARGING AN ELECTRIC VEHICLE

FIELD OF THE INVENTION

The present invention generally relates to the field of systems and methods for recharging an electric vehicle. In particular, the present invention relates to on-board power regulation of an electric vehicle.

BACKGROUND

Electric vehicles require a power source to operate. Most electric vehicles are recharged using a stationary recharge infrastructure that has full power conversion and regulation of the recharge process. However, recharging an electric vehicle with such a recharge infrastructure is inefficient.

SUMMARY OF THE DISCLOSURE

In an aspect, a system for recharging an electric vehicle. A system includes an electric vehicle. An electric vehicle includes at least a propulsor. An electric vehicle includes a recharging connector electrically connected to a power source. An electric vehicle includes a power storage unit. A power storage unit is configured to store power. An electric vehicle includes a power supply circuit. A power supply circuit is in electric communication with a power storage unit and recharging connector. A power supply circuit includes a buck-boost regulator. A buck-boost regulator includes at least an inductor. A buck-boost regulator includes a switching device to supply intermittent current to at least an inductor. At least one of at least an inductor and a switching device is a component of at least a propulsor motor.

In an aspect, a method of recharging an electric vehicle. A method includes selecting an electric vehicle. An electric vehicle includes at least a propulsor motor. An electric vehicle includes a recharging connector. An electric vehicle includes a power storage unit. An electric vehicle includes a power supply circuit. A method includes receiving at a recharging connector a power source. A method includes converting via a power supply circuit a power source into a regulated power output. A method includes storing a regulated power output in a power storage unit.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
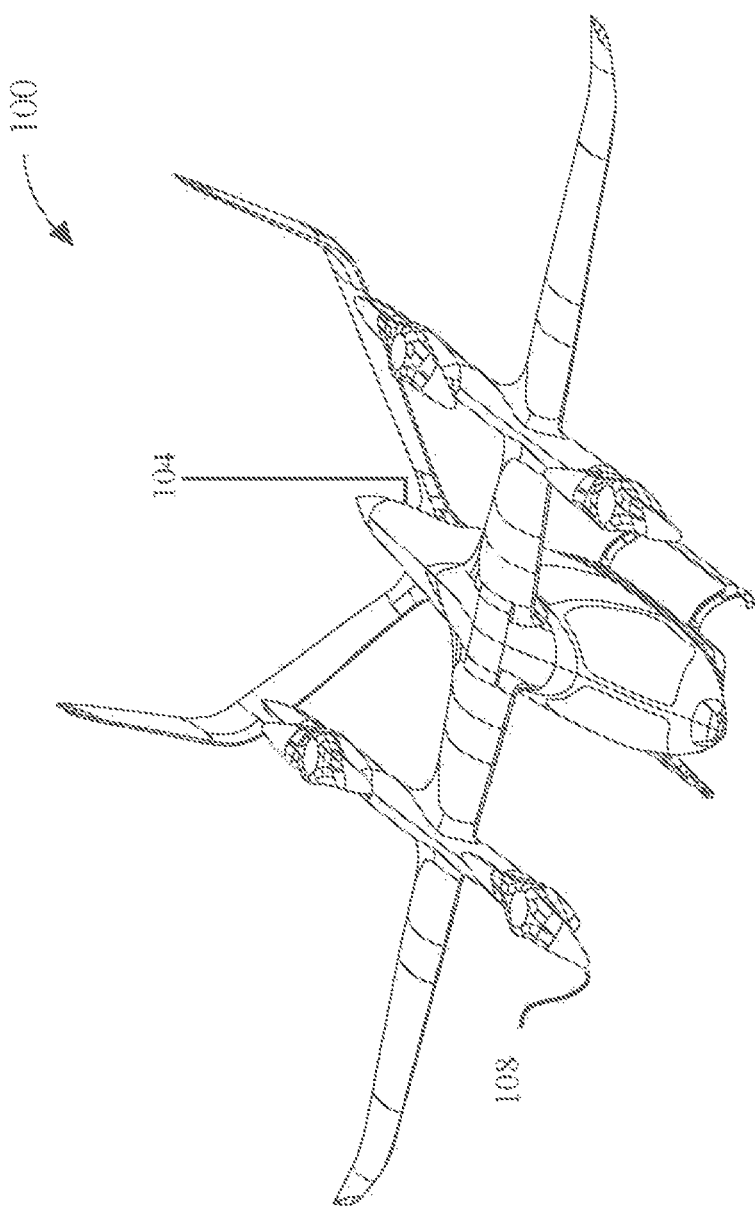
FIG. 1 is an exemplary embodiment of an electric aircraft.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a system for recharging an electric vehicle. a system for recharging an electric vehicle. A system may include an electric vehicle. An electric vehicle may include an electric aircraft. An electric vehicle may include at least a propulsor. An electric vehicle may include a recharging connector electrically connected to a power source. A power source may include an unregulated power source. An electric vehicle may include a power storage unit. A power storage unit may be configured to store power. An electric vehicle may include a power supply circuit. A power supply circuit may be in electric communication with a power storage unit and recharging connector. A power supply circuit may include a buck-boost regulator. A buck-boost regulator may include at least an inductor. A buck-boost regulator may include a switching device to supply intermittent current to at least an inductor. At least one of at least an inductor and a switching device may be a component of at least a propulsor motor.

Described herein is a method of recharging an electric vehicle. A method may include selecting an electric vehicle. An electric vehicle may include an electric aircraft. An electric vehicle may include at least a propulsor motor. A propulsor motor may include at least a winding. A propulsor motor may include at least an inverter and at least a winding. A propulsor motor may include a switching device. A switching device may include at least an inverter and at least an inductor. At least an inductor may include at least a winding. An electric vehicle may include a recharging connector. A recharging connector may include a coupling mechanism configured to couple the charging connector to an external power source. A recharging connector may be configured to detect a characteristic of a power source receive. A recharging connector may be configured to drive a switching device as a function of a detected characteristic. A detected characteristic may include a current metric. An electric vehicle may include a power storage unit. An electric vehicle may include a power supply circuit. A power supply circuit may include a load disconnect switch. A power supply circuit may include a neutral connection switch. A power supply circuit may include at least an inverter and a switching device. A switching device may include at least an inverter. A method may include receiving at a recharging connector a power source. A method may include converting via a power supply circuit a power source into a regulated power output. A method may include storing a regulated power output in a power storage unit.

Referring now to FIG. 1, an illustration of an exemplary embodiment of an electric aircraft 100 is shown. Electric aircraft 100 may include an electric vertical takeoff and landing aircraft (eVTOL). As used herein, a vertical take-off and landing (eVTOL) aircraft is one that may hover, take off, and land vertically. An eVTOL, as used herein, is an electrically powered aircraft typically using an energy source, of a plurality of energy sources to power the aircraft. In order to optimize the power and energy necessary to propel the aircraft. An eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 1, a number of aerodynamic forces may act upon the electric aircraft 100 during flight. Forces acting on an electric aircraft 100 during flight may include, without limitation, thrust, the forward force produced by the rotating element of the electric aircraft 100 and acts parallel to the longitudinal axis. Another force acting upon electric aircraft 100 may be, without limitation, drag, which may be defined as a rearward retarding force which is caused by disruption of airflow by any protruding surface of the electric aircraft 100 such as, without limitation, the wing, rotor, and fuselage. Drag may oppose thrust and acts rearward parallel to the relative wind. A further force acting upon electric aircraft 100 may include, without limitation, weight, which may include a combined load of the electric aircraft 100 itself, crew, baggage, and/or fuel. Weight may pull electric aircraft 100 downward due to the force of gravity. An additional force acting on electric aircraft 100 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 100 are designed to be as lightweight as possible. Reducing the weight of the aircraft and designing to reduce the number of components is essential to optimize the weight. To save energy, it may be useful to reduce weight of components of an electric aircraft 100, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 100 and/or propulsors.

Referring still to FIG. 1, electric aircraft 100 may include at least a vertical propulsor 104 and at least a forward propulsor 108. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 104 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 1, at least a forward propulsor 108 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 104 and at least a forward propulsor 108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 1, during flight, a number of forces may act upon electric aircraft 100. Forces acting on electric aircraft 100 during flight may include thrust, the forward force produced by the rotating element of electric aircraft 100 and acts parallel to the longitudinal axis. Drag may be defined as a rearward retarding force which is caused by disruption of airflow by any protruding surface of electric aircraft 100 such as, without limitation, the wing, rotor, and fuselage. Drag may oppose thrust and acts rearward parallel to the relative wind. Another force acting on electric aircraft 100 may include weight, which may include a combined load of the aircraft 100 itself, crew, baggage and fuel. Weight may pull electric aircraft 100 downward due to the force of gravity. An additional force acting on electric aircraft 100 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Figure 2:
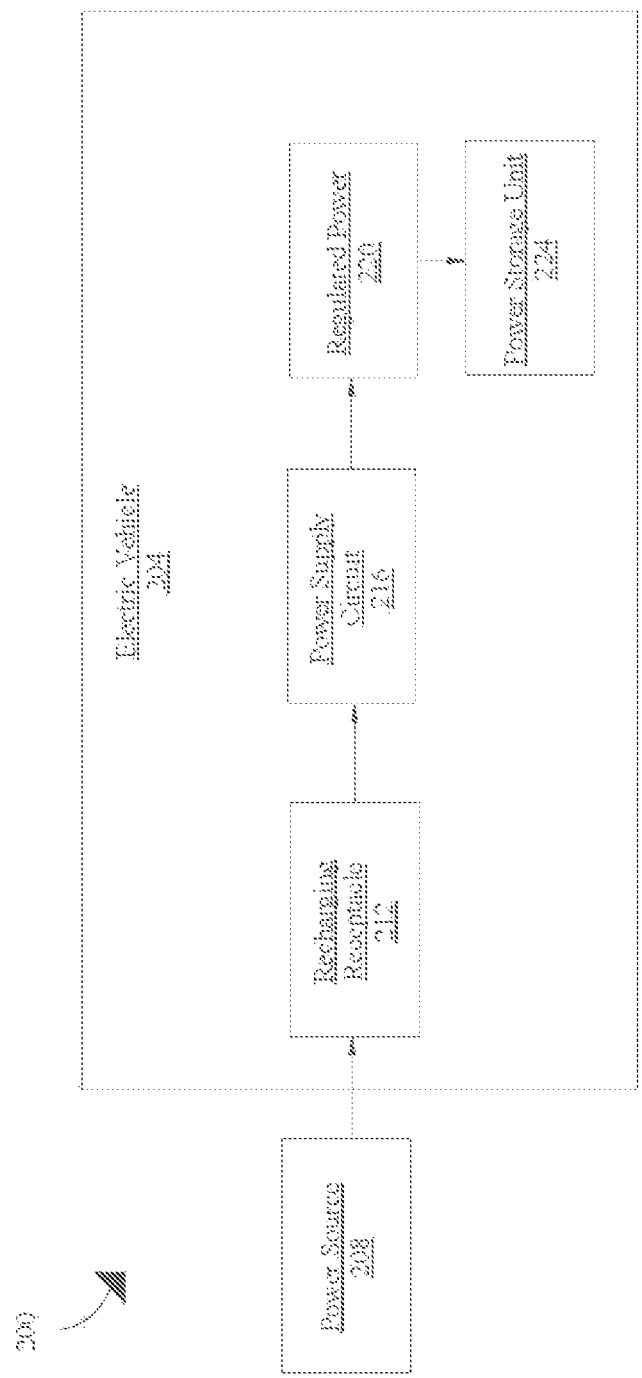
FIG. 2 is a block diagram of a system for recharging an electric vehicle.

Now referring to FIG. 2, a system 200 for recharging an electric vehicle is presented. In some embodiments, system 200 may include electric vehicle 204. Electric vehicle 204 may include any vehicle that is partially and/or fully powered by electricity. In some embodiments, electric vehicle 204 may include, but is not limited to, an eVTOL, helicopter, plane, quadcopter, unmanned aerial vehicle (UAV), or other electric vehicles. In some embodiments, electric vehicle 204 may include an eVTOL as described above with reference to FIG. 1.

Still referring to FIG. 2, in some embodiments, electric vehicle 204 may include recharging receptacle 212. A "recharging receptacle" as used in this disclosure is any component capable of receiving electric power. Recharging receptacle 212 may include connectors, plugs, and the like, that may be capable of transmitting power source 208. A "power source" as used in this disclosure is any form of electric voltage and/or current. In some embodiments, recharging receptacle 212 may be configured to receive power source 208. Power source 208 may be received externally from electric aircraft 204. An external power source 208 may be received from a charging station. A charging station may include a stationary power source 208. In some embodiments, power source 208 may include an unregulated power source. An "unregulated power source" as used in this disclosure is any power source that is not stabilized. In some embodiments, power source 208 may include a voltage, current, and/or frequency. Power source 208 may include between 100V to 1,000V. In some embodiments, power source 208 may include 800V. In some embodiments, power source 208 may include 100 A. In some embodiments, power source 208 may include a frequency of 60 Hz. Recharging receptacle 212 may include an outlet of electric vehicle 204. An outlet may be configured to couple to a charging device. In some embodiments, an outlet may be configured to conform to charging standards, such as, but not limited to, SAE J1772, CHAdeMO, CCS, and/or other charging standards. Recharging receptacle 212 may include a sensing device. A sensing device may be configured to detect a characteristic of power source 208. In some embodiments, a characteristic may include a current level, a current type, a current frequency, a voltage level, a voltage type, a voltage frequency, an impedance, a capacitance, and/or a resistance. A measured characteristic of power source 208 may be transmitted from a sensing device to another component of electric vehicle 204, such as a flight controller.

Still referring to FIG. 2, in some embodiments, electric vehicle 204 may include power supply circuit 216. Power supply circuit 208 may be in electric communication with recharging receptacle 212. "Electric communication" as used in this disclosure is any form of current and/or voltage transmission between two or more components. In some embodiments, power supply circuit 216 may be configured to receive power source 208 from recharging receptacle 212. In some embodiments, power supply circuit 216 may include a plurality of electrical components. A plurality of electrical components may include, but is not limited to, resistors, capacitors, inductors, transistors, transformers, integrated circuit boards, inverters, and the like. In some embodiments, power supply circuit 216 may include a boost regulator. A "boost regulator" as used in this disclosure, is an electric component configured to step up or step down an output voltage from an input voltage. In some embodiments, power supply circuit 216 may include one or more motor windings of electric vehicle 204. A "winding" as used in this disclosure is any conductive wire twisted in a cyclical shape. A "motor winding" as used in this disclosure is any wound conductive wire capable of generating a magnetic field. A motor winding may include a wire made of a conductive element. A "conductive element" as used in this disclosure, is any material that is capable of carrying a current. Power supply circuit 216 may include a plurality of motor drives and/or motor windings. In some embodiments, power supply circuit 216 may implement motor windings of electric vehicle 204 to perform a buck-boost function. A "buck-boost function" as used in this disclosure is a type of DC-to-DC converter that has an output voltage magnitude either greater than or less than the input voltage magnitude. Power supply circuit 216 may be configured to transform a direct current (DC) to an alternating current (AC). In some embodiments, power supply circuit 216 may be configured to transform AC to DC. In some embodiments, power supply circuit 208 may include a load connection switch. A "load connection switch" as used in this disclosure, is a circuit component configured to connect or disconnect a component external to a circuit. In some embodiments, a load connection switch may be configured to allow one or more currents to travel through power supply circuit 216. In some embodiments, a load connection switch may be configured to prevent one or more currents from travelling through power supply circuit 216. In some embodiments, power supply circuit 216 may include a neutral connection switch. A "neutral connection switch" as used in this disclosure, is a circuit component that is configured to connect or disconnect two or more electrical components that complete a circuit back to a power source. In some embodiments, a neutral connection switch of power supply circuit 216 may be configured to connect and/or disconnect two or more inverters of a motor of electric vehicle 204. In some embodiments, power supply circuit 216 may be configured to use a load disconnect switch in combination with a neutral connection switch to perform a buck-boost function.

Still referring to FIG. 2, in some embodiments, power supply circuit 216 may be configured to regulate power source 208. Regulation of power source 208 may include stabilizing a voltage, current, and/or frequency of power source 208 to produce regulated power 220. Regulated power 220 may include a power supply with a stabilized voltage, current, and/or frequency. Regulated power 220 may include between 100V to 800V. In some embodiments, regulated power 220 may include 180V. In some embodiments, regulated power 220 may include between 10 A to 500 A. In some embodiments, regulated power 220 may include 100 A. In some embodiments, regulated power may include a frequency of 15 Hz. In some embodiments, regulated power 220 may include DC and therefore no frequency. In some embodiments, power supply circuit 216 may include a busbar. A busbar may include a conductive element configured to connect multiple electric components. In some embodiments, power supply circuit 216 may include a plurality of busbars. In some embodiments, power supply circuit 216 may include an x-tie element. An x-tie element may include a switch configured to connect or disconnect electric components from one another. In some embodiments, power supply circuit 216 may include a fuse. A "fuse" as used in this disclosure is sacrificial device configured to provide overcurrent protection of an electrical circuit. Power supply circuit 216 may include one or more load fuses. In some embodiments, power supply circuit 216 may include one or more x-tie fuses.

Still referring to FIG. 2, in some embodiments, electric vehicle 204 may include power storage unit 224. Power storage unit 224 may include any component configured to contain electric energy. In some embodiments, power storage unit 224 may be configured to receive regulated power 220 from power supply circuit 216. Power storage unit 224 may include a battery cell. A "battery cell" as used in this disclosure, is an electrochemical component configured to hold a voltage and/or charge. In some embodiments, power storage unit 224 may include a plurality of battery cells. A plurality of battery cells may be connected in a series, parallel, or other type of connection, alone or in combination. In some embodiments, power storage unit 224 may include, but is not limited to, a flywheel battery, rechargeable battery, flow battery, glass battery, lithium-ion battery, ultra battery, and the like. In some embodiments, power storage unit 224 may include a battery pack. A battery pack of power storage unit 224 may be described in further detail below with reference to FIG. 3.

Figure 3:
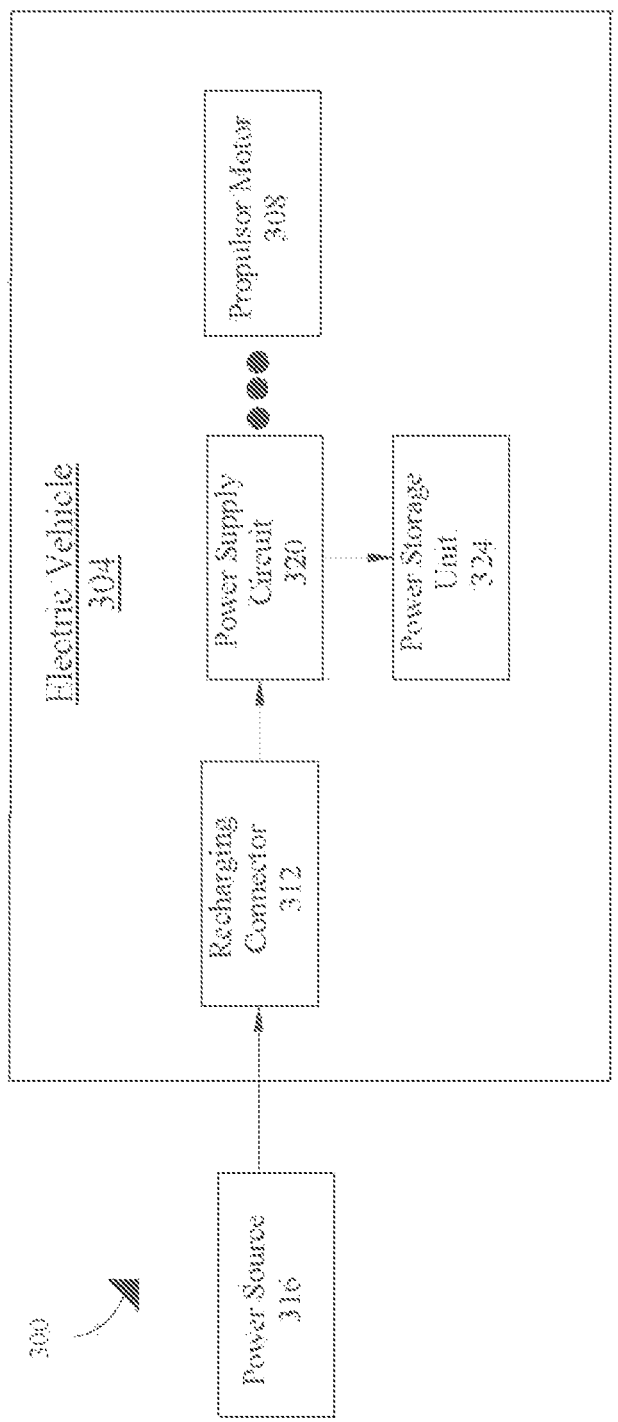
FIG. 3 is another block diagram of a system for recharging an electric vehicle.

Referring now to FIG. 3, system 300 for recharging an electric vehicle is presented. System 300 may include electric vehicle 304. Electric vehicle 304 may include any vehicle as described in this disclosure. Electric vehicle 304 may include any vehicle that is partially and/or fully powered by electricity. In some embodiments, electric vehicle 304 may include, but is not limited to, an eVTOL, helicopter, plane, quadcopter, unmanned aerial vehicle (UAV), or other electric vehicles. In some embodiments, electric vehicle 304 may include an eVTOL as described above with reference to FIG. 1.

Still referring to FIG. 3, electric vehicle 304 may include propulsor motor 308. Propulsor motor 308 may include any propulsor as described throughout this disclosure, such as with reference to FIG. 1. In some embodiments, propulsor motor 308 may include a plurality of motor windings. A motor winding may be as described in U.S. patent application Ser. No. 16/938,952, filed Jul. 25, 2020, and titled "INTEGRATED ELECTRIC PROPULSION ASSEMBLY", of which is incorporated by reference herein in its entirety. Propulsor motor 308 may include without limitation, any electric motor, where an electric motor is a device that converts electrical energy into mechanical energy, for instance by causing a shaft to rotate. Propulsor motor 308 may be driven by direct current (DC) electric power; for instance, propulsor motor 308 may include a brushed DC at least a first motor, or the like. Propulsor motor 308 may be driven by electric power having varying or reversing voltage levels, such as alternating current (AC) power as produced by an alternating current generator and/or inverter, or otherwise varying power, such as produced by a switching power source. In some embodiments, propulsor motor 308 may be configured to operate in a three-phase power system, six-phase power system, and the like. Propulsor motor 308 may include, without limitation, brushless DC electric motors, permanent magnet synchronous at least a first motor, switched reluctance motors, or induction motors. In addition to inverter and/or a switching power source, a circuit driving propulsor motor 308 may include electronic speed controllers or other components for regulating motor speed, rotation direction, and/or dynamic braking. Persons skilled in the art, upon reviewing the entirety of this disclosure, will be aware of various devices that may be used as at least a thrust element.

Still referring to FIG. 3, electric vehicle 304 may include a recharging connector 312. Recharging connector 312 may be configured to receive external power from power source 316. In some embodiments, recharging connector 312 may be configured to transmit power received from power source 316 to another component of electric vehicle 304. A "recharging connector" as used in this disclosure is any component capable of connecting to a power source. Recharging connector 312 may include connectors, plugs, and the like, that may be capable of transmitting power source 316. A "power source" as used in this disclosure is any form of electric voltage and/or current. In some embodiments, recharging connector 312 may be configured to receive power source 316. Power source 316 may be received externally from electric aircraft 304. An external power source 316 may be received from a charging station. A charging station may include a stationary power source 316. In some embodiments, power source 316 may include an unregulated power source. Power source 316 may include a voltage of between 100V to 1,000V. In some embodiments, power source 316 may include 800V. Recharging connector 312 may include an outlet of electric vehicle 304. An outlet may be configured to couple to a charging device. In some embodiments, an outlet may be configured to conform to charging standards, such as, but not limited to, SAE J1772, CHAdeMO, CCS, and/or other charging standards. Recharging connector 312 may include a sensing device. A sensing device may be configured to detect a characteristic of power source 316. In some embodiments, a characteristic may include a current level, a current type, a current frequency, a voltage level, a voltage type, a voltage frequency, an impedance, a capacitance, and/or a resistance. A measured characteristic of power source 316 may be transmitted from a sensing device to another component of electric vehicle 304, such as a flight controller.

Still referring to FIG. 3, in some embodiments, electric vehicle 304 may include power supply circuit 320. Power supply circuit 320 may be in electric communication with recharging connector 312. In some embodiments, power supply circuit 320 may be configured to receive power source 316 from recharging connector 312. In some embodiments, power supply circuit 320 may include a plurality of electrical components. A plurality of electrical components may include, but is not limited to, resistors, capacitors, inductors, transistors, transformers, integrated circuit boards, inverters, and the like. In some embodiments, power supply circuit 320 may include a boost regulator. In some embodiments, power supply circuit 320 may include one or more motor windings of propulsor motor 308. In some embodiments, power supply circuit 320 may include one or more inverters of propulsor motor 308. A motor winding may include a wire made of a conductive element. Power supply circuit 320 may include a plurality of motor drives and/or motor windings. In some embodiments, power supply circuit 320 may implement one or more motor windings and/or one or more inverters of propulsor motor 308 to perform a buck-boost function. In some embodiments, power supply circuit 320 may implement a plurality of motor windings and/or inverters of a plurality of propulsor motors. Power supply circuit 320 may be configured to transform a direct current (DC) to an alternating current (AC). In some embodiments, power supply circuit 320 may be configured to transform AC to DC. In some embodiments power supply circuit 320 may include a switching device. A "switching device" as used in this disclosure is any component capable of transitioning one or more elements between two or more states. In some embodiments, a switching device of power supply circuit 320 may include a load connection switch. In some embodiments, a load connection switch may be configured to allow one or more currents to travel through power supply circuit 320. In some embodiments, a load connection switch may be configured to prevent one or more currents from travelling through power supply circuit 320. In some embodiments, a switching device of power supply circuit 320 may include a neutral connection switch. In some embodiments, a neutral connection switch of power supply circuit 320 may be configured to connect and/or disconnect two or more inverters of two or more propulsor motors. In some embodiments, a switching device of power supply circuit 320 may be configured to use a load disconnect switch in combination with a neutral connection switch to perform a buck-boost function. In some embodiments, a switching device of power supply circuit 320 may include a control circuit. A control circuit may be configured to drive a switching of a load disconnect switch and a neutral connection switch. In some embodiments, a control circuit may include a flight controller.

Still referring to FIG. 3, in some embodiments, power supply circuit 320 may be configured to regulate power source 316. Regulation of power source 316 may include stabilizing a voltage, current, and/or frequency of power source 316 to produce regulated power. Regulated power may include a power supply with a stabilized voltage, current, and/or frequency. Regulated power may include between 100V to 800V. In some embodiments, regulated power may include 180V. In some embodiments, regulated power may include 50 A. In some embodiments, regulated power may include between 100 A to 200 A. In some embodiments, regulated power may include a frequency of 15 Hz. In some embodiments, regulated power may include DC and therefore no frequency. In some embodiments, power supply circuit 320 may include a busbar. A busbar may include a conductive element configured to connect multiple electric components. In some embodiments, power supply circuit 320 may include a plurality of busbars. In some embodiments, power supply circuit 320 may include an x-tie element. An x-tie element may include a switch configured to connect or disconnect electric components from one another. In some embodiments, power supply circuit 320 may include a fuse. A "fuse" as used in this disclosure is sacrificial device configured to provide overcurrent protection of an electrical circuit. Power supply circuit 320 may include one or more load fuses. In some embodiments, power supply circuit 320 may include one or more x-tie fuses.

Still referring to FIG. 3, in some embodiments, electric vehicle 304 may include power storage unit 324. Power storage unit 324 may include any component configured to contain electric energy. In some embodiments, power storage unit 324 may be configured to receive regulated power from power supply circuit 320. Power storage unit 324 may include a battery cell. In some embodiments, power storage unit 324 may include a plurality of battery cells. A plurality of battery cells may be connected in a series, parallel, or other type of connection, alone or in combination. In some embodiments, power storage unit 324 may include, but is not limited to, a flywheel battery, rechargeable battery, flow battery, glass battery, lithium-ion battery, ultra battery, and the like. In some embodiments, power storage unit 324 may include a battery pack.

Figure 4:
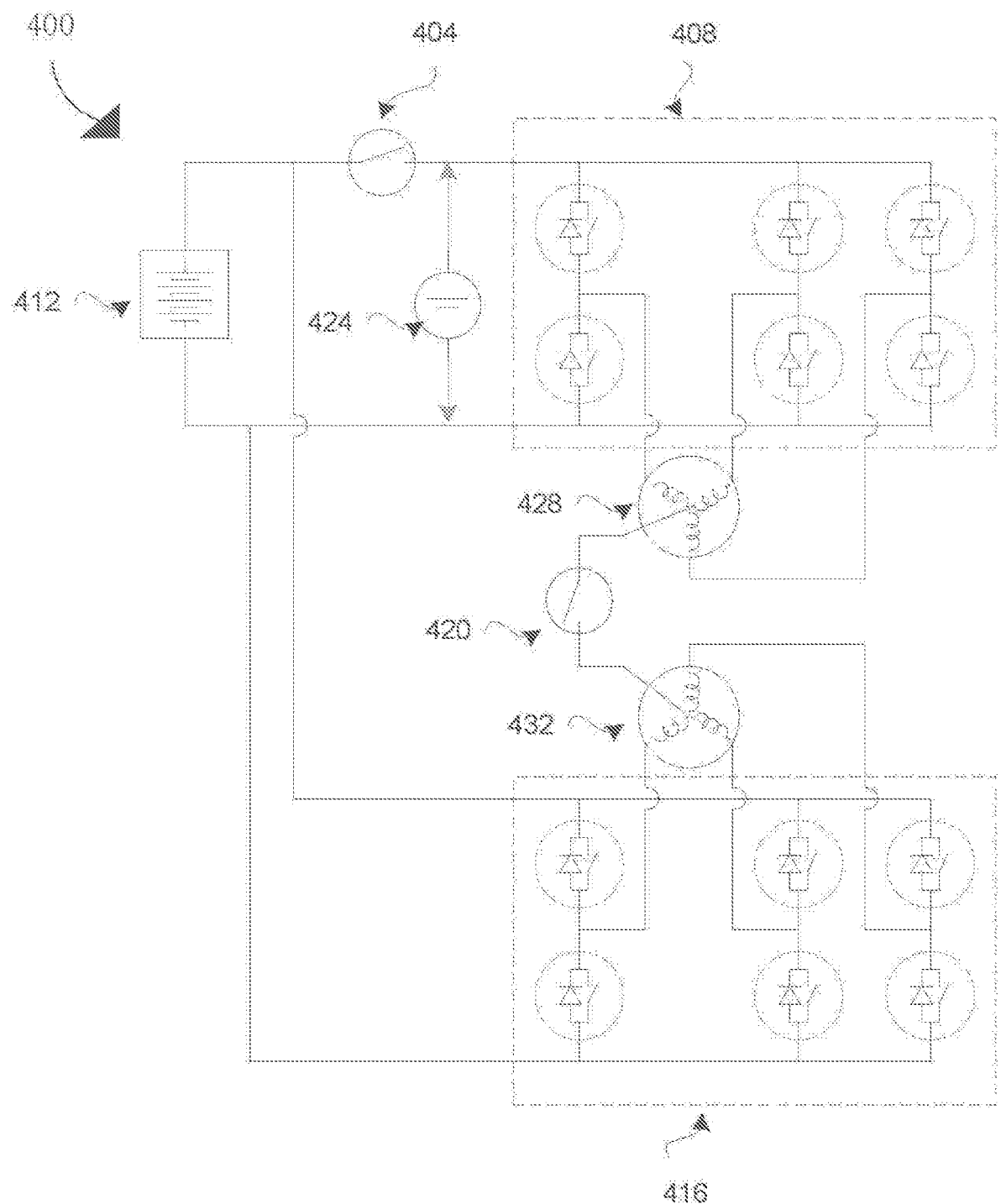
FIG. 4 is a circuit diagram of a recharging system.

Referring now to FIG. 4, circuit 400 is shown. Circuit 400 may include energy storage 412. Energy storage 412 may include a battery, capacitor, and/or any other component configured to store electrical energy. Circuit 400 may include energy source 424. Energy source 424 may include a voltage. A voltage may include, but is not limited to, a DC voltage, AC voltage, unregulated voltage, and the like. Circuit 400 may include load connection switch 404. Load connection switch 404 may include, but is not limited to, a transistor, electromechanical switch, integrated circuit, and the like. In some embodiments, energy source 424 may be positioned between load connection switch 404 and first inverter 408. First invertor 408 may include an inverter of first motor 428. First motor 428 may include an inductive element. Circuit 400 may include second inverter 416. Second inverter 416 may include an inverter of second motor 432. Second motor 432 may include an inductive element. First inverter 408 and second inverter 416 may be configured to transform DC into AC. First inverter 408 may be configured to supply power to first motor 428. Second inverter may be configured to supply power to second motor 432. In some embodiments, circuit 400 may include neutral switch 420. Neutral switch 420 may include, but is not limited to, a transistor, electromechanical switch, integrated circuit, and the like.

Still referring to FIG. 4, circuit 400 may be configured to operate as a boost regulator. Load connection switch 404 may be switched off, which may direct current from energy source 424 to first inverter 408. First inverter 408 may include a plurality of diodes. Diodes may be configured to direct a current to a direction while preventing a current from entering through an opposite direction. A plurality of diodes of first inverter 408 may direct current to first motor 428. First motor 428 may store energy from a current of energy source 424 in a form of a magnetic field. A magnetic field of first motor 428 may oppose a polarity of energy source 424. In some embodiments, load connection switch 404 may be switched on, which may connect first motor 428 and first inverter 408 to energy storage 412. A magnetic field of first motor 428 may collapse, which may generate a voltage of a same polarity of energy source 424. Energy storage 412 may receive a combined voltage from energy source 424 and first motor 428. A combined voltage from first motor 428 and energy storage 424 may produce a net voltage greater than that of energy source 424. An increase of a net voltage may reduce a net current of circuit 400, due to power conservation laws (P=IV). Circuit 400 may operate load connection switch 404 to increase a voltage supplied to energy storage 412 while decreasing a current.

Still referring to FIG. 4, circuit 400 may be configured to operate as a buck regulator. Neutral connection switch 420 may be switched on, which may connect first motor 428 to second motor 432. Current may travel from energy source 424 to first motor 428. Current may travel from first motor 428 to second motor 432. First motor 428 and/or second motor 432 may oppose a change in current from energy storage 424. First motor 428 and/or second motor 432 may generate a voltage of opposite polarity to energy source 424. A voltage of opposing polarity from first motor 428 and/or second motor 432 may reduce a net voltage supplied to energy storage 412. A current of circuit 400 may increase in response to the decrease of voltage, due to power conservation laws (P=IV). Circuit 400 may operate neutral switch 420 to reduce a net voltage supplied to energy storage 412 while increasing a current of circuit 400. Circuit 400 may use load connection switch 404 and neutral connection switch 420 to increase or decrease a voltage delivered to energy storage 412.

Figure 5:
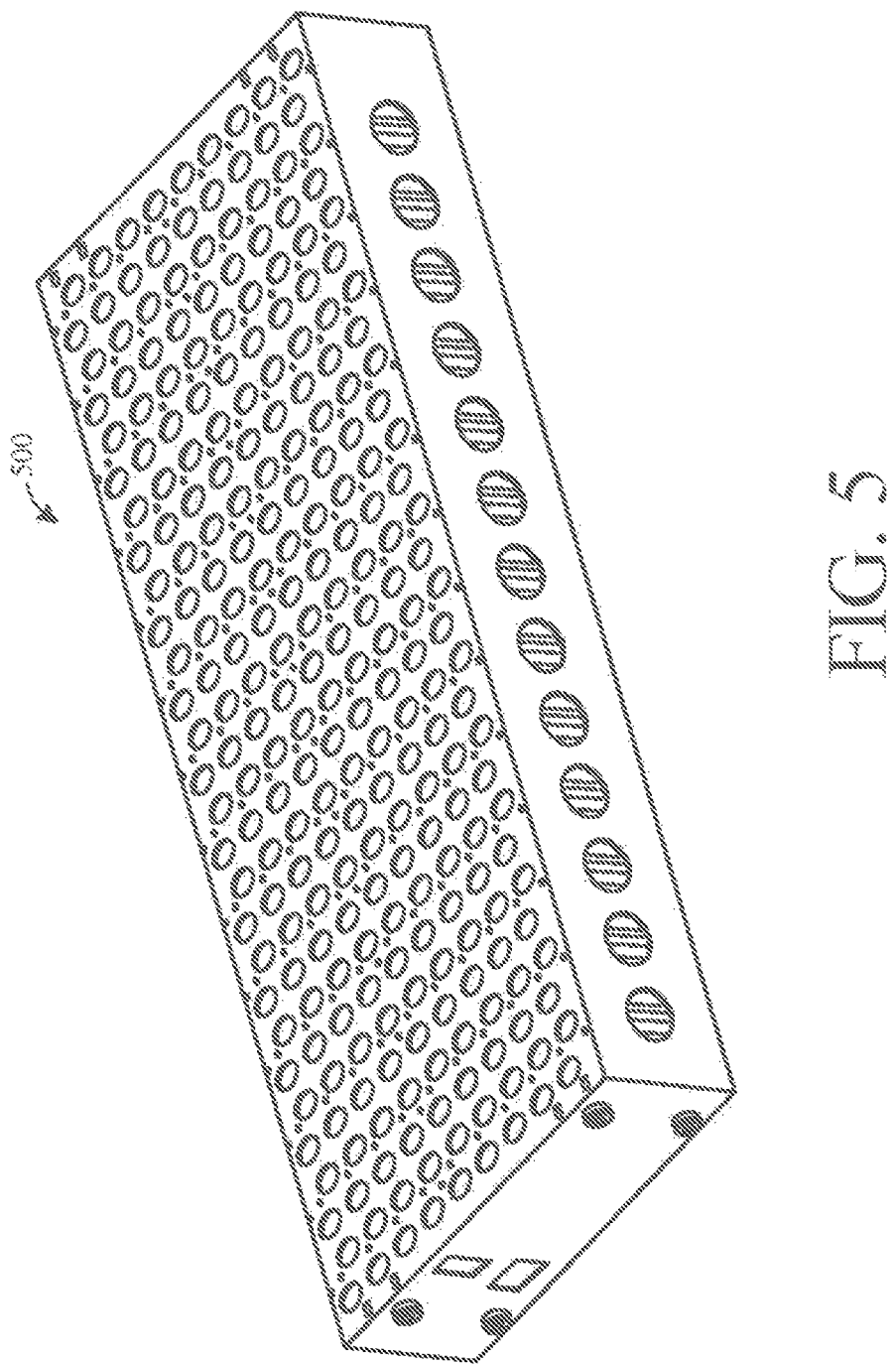
FIG. 5 is a block diagram of a battery pack of an electric aircraft.

Referring now to FIG. 5, an exemplary embodiment of battery module 500 is illustrated. In embodiments, each circle illustrated represents a battery cell's circular cross-section. A battery cell, which will be adequately described below may take a plurality of forms, but for the purposes of these illustrations and disclosure, will be represented by a cylinder, with circles in representing the cross section of one cell each. With this orientation, a cylindrical battery cell has a long axis not visible in illustration. Battery cells are disposed in a staggered arrangement, with one battery unit including two columns of staggered cells. Each battery unit includes at least the cell retainer including a sheet of material with holes in a staggered pattern corresponding to the staggered orientation of cells. Cell retainer is the component which fixes the battery cells in their orientation amongst the entirety of the battery module. Cell retainer also includes two columns of staggered holes corresponding to the battery cells. There is the cell guide disposed between each set of two columns of the battery cells underneath the cell retainer. Battery module can include a protective wrapping which weaves in between the two columns of the battery cells contained in a battery unit.

With continued reference to FIG. 5, battery module 500 may include a sense board, a side panel, an end cap, electrical bus, and openings are presented. In an embodiment, a sense board is illustrated in its entirety. A sense board may include at least a portion of a circuit board that includes one or more sensors configured to measure the temperature of the battery cells disposed within battery module 500. In embodiments, sensor board may include one or more openings disposed in rows and column on a surface of sense board. In embodiments, each hole may correspond to the battery cells disposed within, encapsulated, at least in part, by battery units. For example, the location of each hole may correspond to the location of each battery cell disposed within battery module 500.

Referring still to FIG. 5, according to embodiment, battery module 500 can include one or more side panels. A side panel can include a protective layer of material configured to create a barrier between internal components of battery module 500 and other aircraft components or environment. A side panel may include opposite and opposing faces that form a side of and encapsulate at least a portion of battery module 500. A side panel may include metallic materials like aluminum, aluminum alloys, steel alloys, copper, tin, titanium, another undisclosed material, or a combination thereof. A side panel may not preclude use of nonmetallic materials alone or in combination with metallic components permanently or temporarily coupled together. Nonmetallic materials that may be used alone or in combination in the construction of a side panel may include high density polyethylene (HDPE), polypropylene, polycarbonate, acrylonitrile butadiene styrene, polyethylene, nylon, polystyrene, polyether ether ketone, to name a few. A side panel may be manufactured by a number of processes alone or in combination, including but limited to, machining, milling, forging, casting, 3D printing (or other additive manufacturing methods), turning, or injection molding, to name a few. One of ordinary skill in the art would appreciate that a side panel may be manufactured in pieces and assembled together by screws, nails, rivets, dowels, pins, epoxy, glue, welding, crimping, or another undisclosed method alone or in combination. A side panel may be coupled to sense board, the back plate, and/or an end cap through standard hardware like a bolt and nut mechanism, for example.

With continued reference to FIG. 5, battery module 500 may also include one or more end caps. An end cap may include a nonconductive component configured to align the back plate, sense board, and internal battery components of battery module 500 and hold their position. An end cap may form and end of and encapsulate a portion of a first end of battery module 500 and a second opposite and opposing end cap may form a second end and encapsulate a portion of a second end of battery module 500. An end cap may include a snap attachment mechanism further including a protruding boss which can configured to be captured, at least in part by a receptable of a corresponding size, by a receptacle disposed in or on the back plate. An end cap may employ a similar or same method for coupling itself to sense board, which may include a similar or the same receptacle. One or ordinary skill in the art would appreciate that the embodiments of a quick attach/detach mechanism end cap is only an example and any number of mechanisms and methods may be used for this purpose. It should also be noted that other mechanical coupling mechanisms may be used that are not necessarily designed for quick removal. Said mechanical coupling may include, as a non-limiting example, rigid coupling (e.g. beam coupling), bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. An end cap may include a nonconductive component manufactured from or by a process that renders it incapable or unsuitable for conveying electrical through, on, or over it. Nonconductive materials an end cap may include may be paper, Teflon, glass, rubber, fiberglass, porcelain, ceramic, quartz, various plastics like HDPE, ABS, among others alone or in combination.

Still referring to FIG. 5, an end cap may include an electrical bus. An electrical bus, for the purposes of this disclosure and in electrical parlance is any common connection to which any number of loads, which may be connected in parallel, and share a relatively similar voltage may be electrically coupled. Electrical bus may refer to power busses, audio busses, video busses, computing address busses, and/or data busses. Electrical bus may be responsible for conveying electrical energy stored in battery module 500 to at least a portion of an eVTOL aircraft. The same or a distinct electrical bus may additionally or alternatively responsible for conveying electrical signals generated by any number of components within battery module 500 to any destination on or offboard an eVTOL aircraft. An end cap may include wiring or conductive surfaces only in portions required to electrically couple electrical bus to electrical power or necessary circuits to convey that power or signals to their destinations.

Still referring to FIG. 5, and in embodiments, a battery module with multiple battery units is illustrated, according to embodiments. Battery module 500 may include a battery cell, the cell retainer, a cell guide, a protective wrapping, a back plate, an end cap, and a side panel. Battery module 500 may include a plurality of the battery cells. In embodiments, the battery cells may be disposed and/or arranged within a respective battery unit in groupings of any number of columns and rows. For example, in the illustrative embodiment of FIG. 5, the battery cells are arranged in each respective battery unit with 18 cells in two columns. It should be noted that although the illustration may be interpreted as containing rows and columns, that the groupings of the battery cells in a battery unit, that the rows are only present as a consequence of the repetitive nature of the pattern of staggered the battery cells and battery cell holes in the cell retainer being aligned in a series. While in the illustrative embodiment of FIG. 5 the battery cells are arranged 18 to a battery unit with a plurality of battery units including battery module 500, one of skill in the art will understand that the battery cells may be arranged in any number to a row and in any number of columns and further, any number of battery units may be present in battery module 500. According to embodiments, the battery cells within a first column may be disposed and/or arranged such that they are staggered relative to the battery cells within a second column. In this way, any two adjacent rows of the battery cells may not be laterally adjacent but instead may be respectively offset a predetermined distance. In embodiments, any two adjacent rows of the battery cells may be offset by a distance equal to a radius of a battery cell. This arrangement of the battery cells is only a non-limiting example and in no way preclude other arrangement of the battery cells.

Battery module 500 may also include a protective wrapping woven between the plurality of the battery cells. Protective wrapping may provide fire protection, thermal containment, and thermal runaway during a battery cell malfunction or within normal operating limits of one or more the battery cells and/or potentially, battery module 500 as a whole. Battery module 500 may also include a backplate. A backplate is configured to provide structure and encapsulate at least a portion of the battery cells, the cell retainers, the cell guides, and protective wraps. End cap may be configured to encapsulate at least a portion of the battery cells, the cell retainers, the cell guides, and battery units, as will be discussed further below, end cap may include a protruding boss that clicks into receivers in both ends of the back plate, as well as a similar boss on a second end that clicks into sense board. Side panel may provide another structural element with two opposite and opposing faces and further configured to encapsulate at least a portion of the battery cells, the cell retainers, the cell guides, and battery units.

In embodiments, battery module 500 can include one or more the battery cells. In another embodiment, battery module 500 includes a plurality of individual the battery cells. Battery cells may each include a cell configured to include an electrochemical reaction that produces electrical energy sufficient to power at least a portion of an eVTOL aircraft. Battery cell may include electrochemical cells, galvanic cells, electrolytic cells, fuel cells, flow cells, voltaic cells, or any combination thereof—to name a few. In embodiments, the battery cells may be electrically connected in series, in parallel, or a combination of series and parallel. Series connection, as used herein, includes wiring a first terminal of a first cell to a second terminal of a second cell and further configured to include a single conductive path for electricity to flow while maintaining the same current (measured in Amperes) through any component in the circuit. Battery cells may use the term 'wired', but one of ordinary skill in the art would appreciate that this term is synonymous with 'electrically connected', and that there are many ways to couple electrical elements like the battery cells together. As an example, the battery cells can be coupled via prefabricated terminals of a first gender that mate with a second terminal with a second gender. Parallel connection, as used herein, includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in any arrangement which may confer onto the system the electrical advantages associated with that arrangement such as high-voltage applications, high-current applications, or the like. As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other. According to embodiments and as discussed above, any two rows of the battery cells and therefore the cell retainer openings are shifted one half-length so that no two the battery cells are directly next to the next along the length of the battery module 500, this is the staggered arrangement presented in the illustrated embodiment of FIG. 5. Cell retainer may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer may include staggered openings that align with the battery cells and further configured to hold the battery cells in fixed positions. Cell retainer may include an injection molded component. Injection molded component may include a component manufactured by injecting a liquid into a mold and letting it solidify, taking the shape of the mold in its hardened form. Cell retainer may include liquid crystal polymer, polypropylene, polycarbonate, acrylonitrile butadiene styrene, polyethylene, nylon, polystyrene, polyether ether ketone, to name a few. Cell retainer may include a second the cell retainer fixed to the second end of the battery cells and configured to hold the battery cells in place from both ends. Second cell retainer may include similar or the exact same characteristics and functions of first the cell retainer. Battery module 500 may also include the cell guide. In embodiments, cell guide can be configured to distribute heat that may be generated by the battery cells. According to embodiments, battery module 500 may also include the back plate. Back plate is configured to provide a base structure for battery module 500 and may encapsulate at least a portion thereof. Backplate can have any shape and includes opposite, opposing sides with a thickness between them. In embodiments, the back plate may include an effectively flat, rectangular prism shaped sheet. For example, the back plate can include one side of a larger rectangular prism which characterizes the shape of battery module 500 as a whole. Back plate also includes openings correlating to each battery cell of the plurality of the battery cells. Back plate may include a lamination of multiple layers. The layers that are laminated together may include FR-4, a glass-reinforced epoxy laminate material, and a thermal barrier of a similar or exact same type as disclosed hereinabove. Back plate may be configured to provide structural support and containment of at least a portion of battery module 500 as well as provide fire and thermal protection. According to embodiments, battery module 500 may also include an end cap configured to encapsulate at least a portion of battery module 500. End cap may provide structural support for battery module 500 and hold the back plate in a fixed relative position compared to the overall battery module 500. End cap may include a protruding boss on a first end that mates up with and snaps into a receiving feature on a first end of the back plate. End cap may include a second protruding boss on a second end that mates up with and snaps into a receiving feature on the sense board. Battery module 500 may also include at least a side panel that may encapsulate two sides of battery module 500. Any side panel may include opposite and opposing faces including a metal or composite material. Side panel(s) may provide structural support for battery module 500 and provide a barrier to separate battery module 500 from exterior components within aircraft or environment.

With continued reference to FIG. 5, any of the disclosed systems, namely battery module 500 or one or more battery packs may incorporate provisions to dissipate heat energy present due to electrical resistance in integral circuit. Battery module 500 includes one or more battery element modules wired in series and/or parallel. The presence of a voltage difference and associated amperage inevitably will increase heat energy present in and around battery module 500 as a whole. The presence of heat energy in a power system is potentially dangerous by introducing energy possibly sufficient to damage mechanical, electrical, and/or other systems present in at least a portion of exemplary aircraft 00. Battery module 500 may include mechanical design elements, one of ordinary skill in the art, may thermodynamically dissipate heat energy away from battery module 500. The mechanical design may include, but is not limited to, slots, fins, heat sinks, perforations, a combination thereof, or another undisclosed element.

With continued reference to FIG. 5, heat dissipation may include material selection beneficial to move heat energy in a suitable manner for operation of battery module 500. Certain materials with specific atomic structures and therefore specific elemental or alloyed properties and characteristics may be selected in construction of battery module 500 to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof.

With continued reference to FIG. 5, heat dissipation may include a combination of mechanical design and material selection. The responsibility of heat dissipation may fall upon the material selection and design as disclosed above in regard to any component disclosed in this paper. Battery module 500 may include similar or identical features and materials ascribed to battery module 500 in order to manage the heat energy produced by these systems and components.

With continued reference to FIG. 5, according to embodiments, the circuitry battery module 500 may include, as discussed above, may be shielded from electromagnetic interference. The battery elements and associated circuitry may be shielded by material such as mylar, aluminum, copper a combination thereof, or another suitable material. Battery module 500 and associated circuitry may include one or more of the aforementioned materials in their inherent construction or additionally added after manufacture for the express purpose of shielding a vulnerable component. Battery module 500 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. The shielding may include an aforementioned material in this section, a mechanical design configured to dissipate the interfering energy, and/or a combination thereof. The shielding including material, location and additional shielding elements may defend a vulnerable component from one or more types of energy at a single time and instance or include separate shielding for individual potentially interfering energies.

With continued reference to FIG. 5, battery module 500 may be a portion of a battery pack, the battery pack may be a power source that is configured to store electrical energy in the form of a plurality of battery modules, which themselves are included of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like the battery cells together. An example of a connector that do not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, the battery pack include 196 battery cells in series and 18 battery cells in parallel. This is, as someone of ordinary skill in the art would appreciate, is only an example and the battery pack may be configured to have a near limitless arrangement of battery cell configurations.

With continued reference to FIG. 5, a battery pack may include a plurality of battery modules 500. Battery modules 500 may be wired together in series and in parallel. Battery pack may include center sheet which may include a thin barrier. The barrier may include a fuse connecting battery modules on either side of center sheet. The fuse may be disposed in or on center sheet and configured to connect to an electric circuit including a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. Fuse may include a thermal fuse, mechanical fuse, blade fuse, expulsion fuse, spark gap surge arrestor, varistor, or a combination thereof. Battery pack may also include a side wall includes a laminate of a plurality of layers configured to thermally insulate the plurality of battery modules from external components of the battery pack. Side wall layers may include materials which possess characteristics suitable for thermal insulation as described in the entirety of this disclosure like fiberglass, air, iron fibers, polystyrene foam, and thin plastic films, to name a few. Side wall may additionally or alternatively electrically insulate the plurality of battery modules from external components of the battery pack and the layers of which may include polyvinyl chloride (PVC), glass, asbestos, rigid laminate, varnish, resin, paper, Teflon, rubber, and mechanical lamina. Center sheet may be mechanically coupled to side wall in any manner described in the entirety of this disclosure or otherwise undisclosed methods, alone or in combination. Side wall may include a feature for alignment and coupling to center sheet. This feature may include a cutout, slots, holes, bosses, ridges, channels, and/or other undisclosed mechanical features, alone or in combination. Battery pack may also include the end panel including a plurality of electrical connectors and further configured to fix the battery pack in alignment with at least a side wall. End panel may include a plurality of electrical connectors of a first gender configured to electrically and mechanically couple to electrical connectors of a second gender. End panel may be configured to convey electrical energy from the battery cells to at least a portion of an eVTOL aircraft. Electrical energy may be configured to power at least a portion of an eVTOL aircraft or include signals to notify aircraft computers, personnel, users, pilots, and any others of information regarding battery health, emergencies, and/or electrical characteristics. The plurality of electrical connectors may include blind mate connectors, plug and socket connectors, screw terminals, ring and spade connectors, blade connectors, and/or an undisclosed type alone or in combination. The electrical connectors of which the end panel includes may be configured for power and communication purposes. A first end of the end panel may be configured to mechanically couple to a first end of a first side wall by a snap attachment mechanism, similar to end cap and side panel configuration utilized in the battery module. To reiterate, a protrusion disposed in or on the end panel may be captured, at least in part, by a receptacle disposed in or on side wall. A second end of the end panel may be mechanically coupled to a second end of a second side wall in a similar or the same mechanism.

Figure 6:
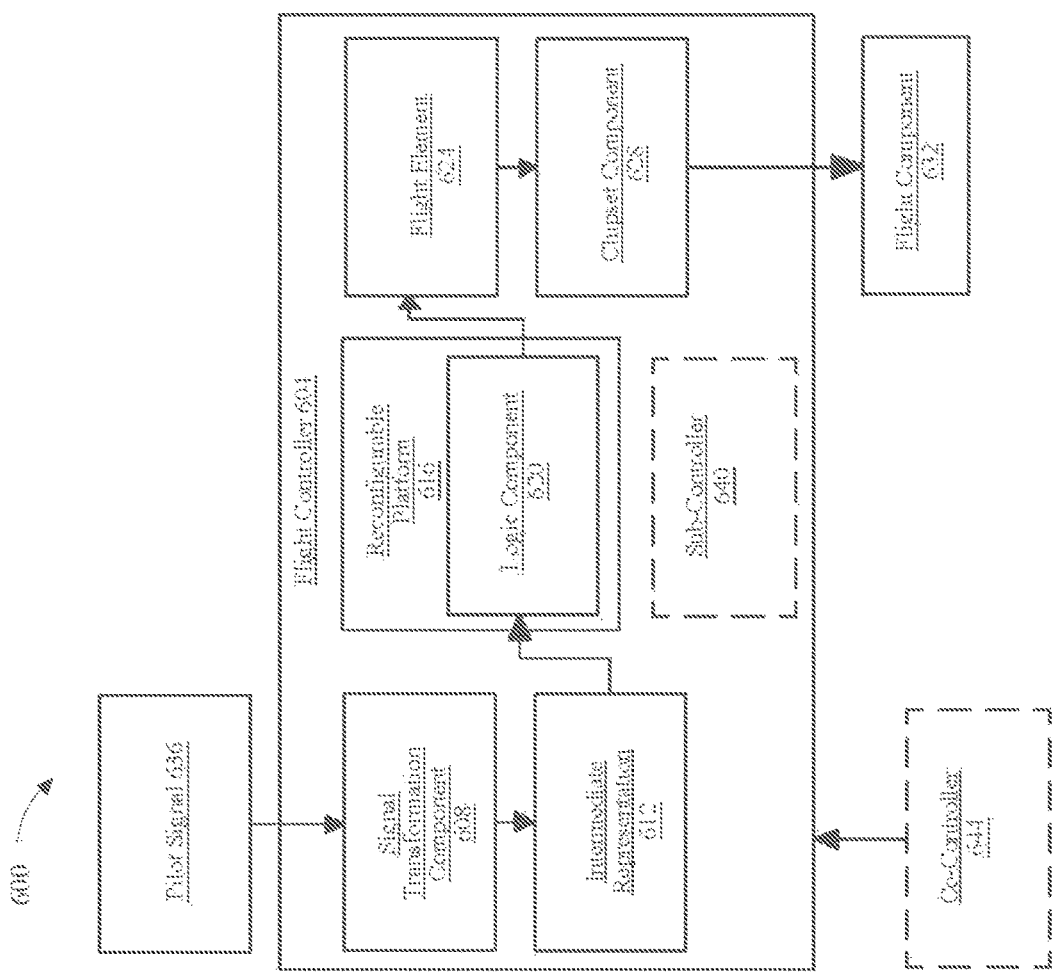
FIG. 6 is an exemplary embodiment of a flight controller of an aircraft.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. In some embodiments, flight controller 604 may be in communication with recharging receptacle 212, power supply circuit 216, and/or power storage unit 224 as described above in FIG. 2. Flight controller 604 may be configured to control recharging system 200. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
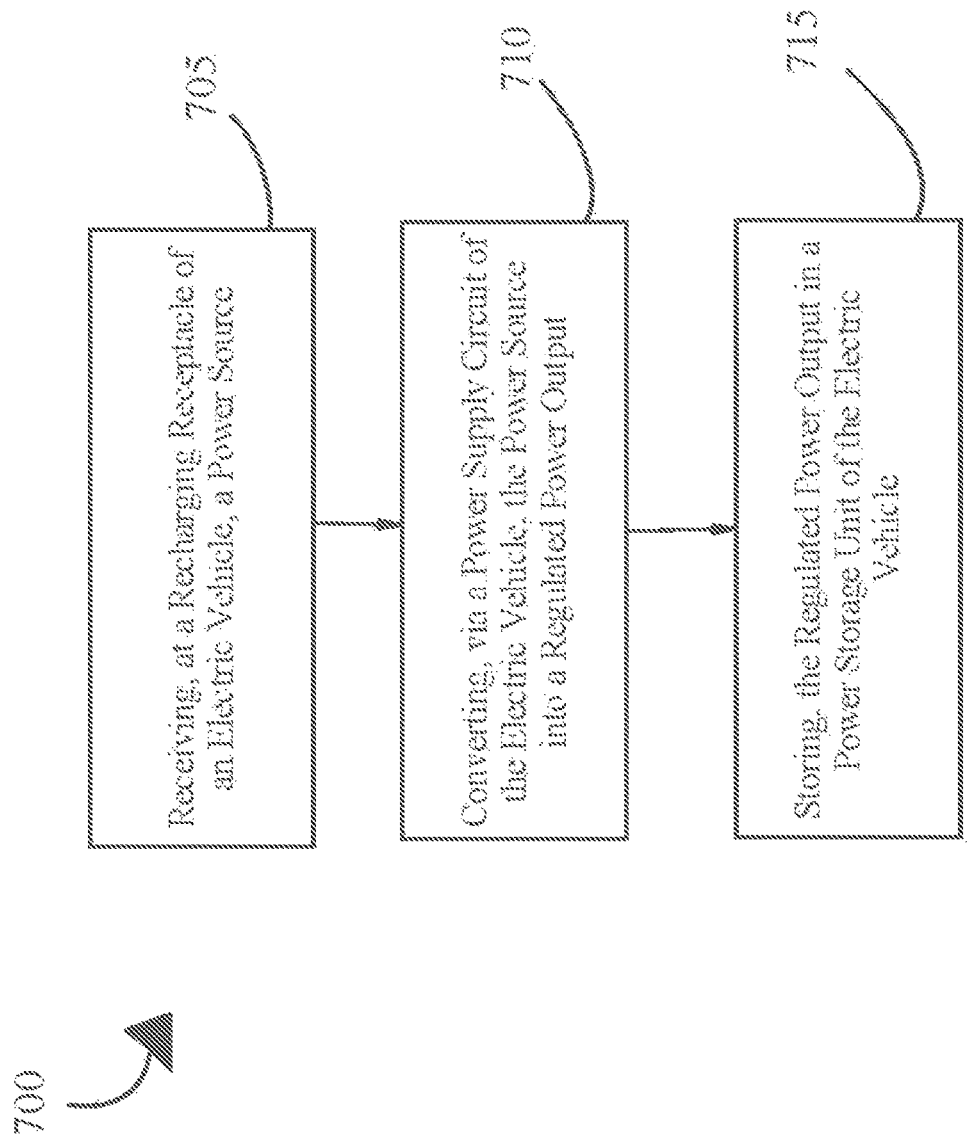
FIG. 7 is a flowchart for a method of recharging an electric vehicle.

Referring now to FIG. 7, a method 700 for recharging an electric vehicle is presented. At step 705, method 700 includes receiving, at a recharging connector of an electric vehicle, a power source. In some embodiments, an electric vehicle may include an electric aircraft. In some embodiments, a recharging connector of an electric vehicle may be configured to couple to an external power source. In some embodiments, a power source may include an unregulated power source. Receiving a power source through a recharging connector of an electric vehicle may be as described in FIGS. 2-3.

Still referring to FIG. 7, at step 710, method 700 includes converting, via a power supply circuit of the electric vehicle, the power source into a regulated power output. In some embodiments, a power supply circuit may include one or more motor windings of an electric vehicle. In some embodiments, a power supply circuit may include a load disconnect switch. In some embodiments, a power supply circuit may include a neutral connection switch. In some embodiments, a power supply circuit may be configured to perform a buck-boost function. In some embodiments, a power supply circuit may include a boost regulator. Regulating a power source through a power supply circuit may be as described above in FIGS. 2-4.

Still referring to FIG. 7, at step 715, method 700 includes storing the regulated power output in a power storage unit of the electric vehicle. A power storage unit may include a plurality of battery cells. In some embodiments, a power storage unit may include a rechargeable battery. A power storage unit may be as described above in FIGS. 2-3.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
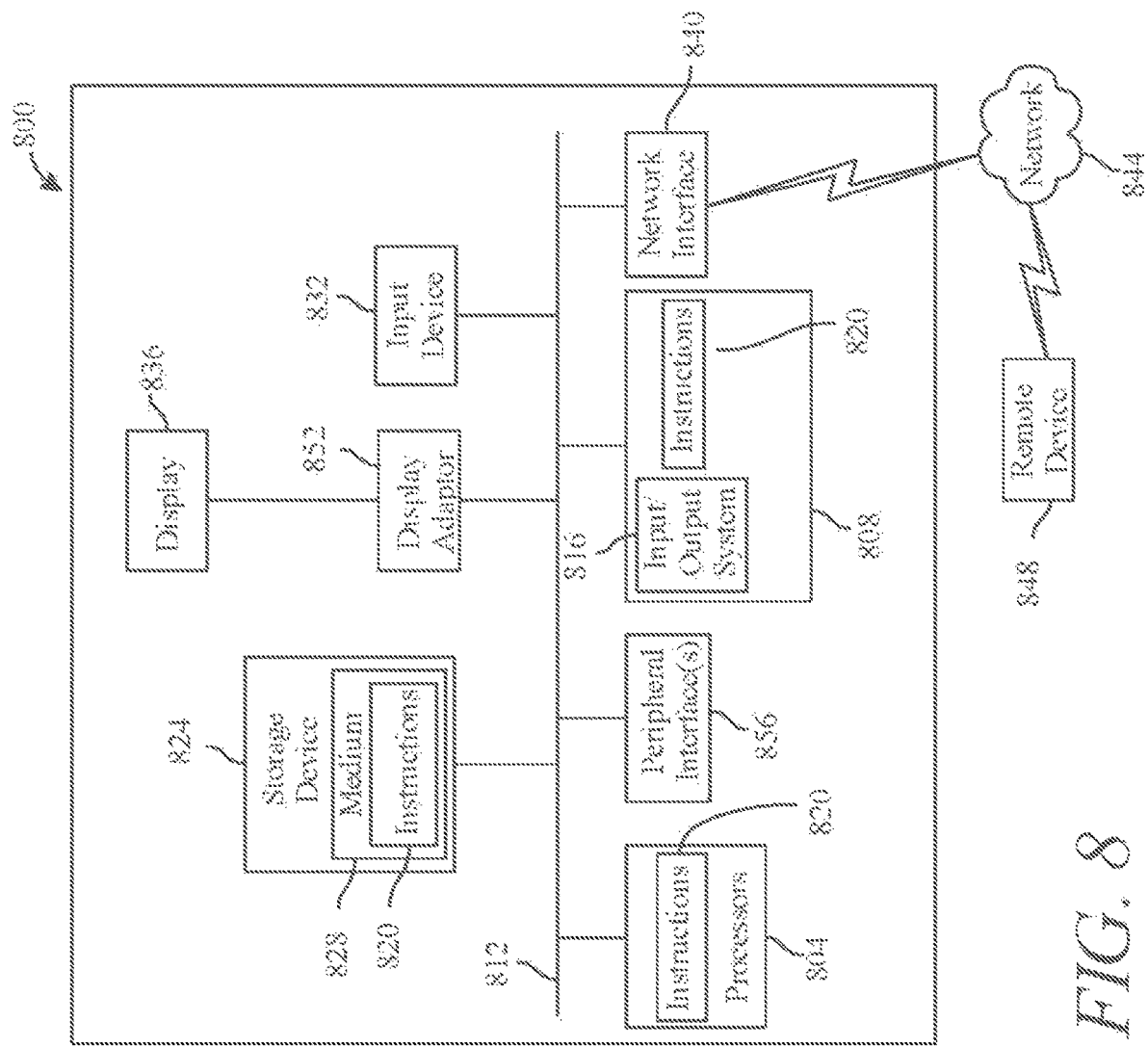
FIG. 8 is a block diagram of an exemplary embodiment of a computing system.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for recharging an electric vehicle, comprising:
    an electric vehicle, the electric vehicle comprising:
       one or more propulsor motors;
       a recharging connector electrically connected to a power source;
       a power storage unit, wherein the power storage unit is configured to store power; and
       a power supply circuit, wherein the power supply circuit is in electric communication with the power storage unit, and the recharging connector using one or more busbar, wherein the power supply circuit further comprises a buck-boost regulator operating as a neutral connection switch configured to electrically connect one or more of the at least a propulsor motors, wherein the buck-boost regulator further comprises:
          at least an inductor; and
          a switching device to supply intermittent current to the at least an inductor, wherein the switching device is configured to perform a buck boost function.

2. The system of claim 1, wherein the electric vehicle includes an electric aircraft.

3. The system of claim 1, wherein the power source includes an unregulated power source.

4. The system of claim 1, wherein the power supply circuit further comprises:
    a load disconnect switch; and
    a neutral connection switch.

5. The system of claim 1, wherein:
    the electric vehicle further comprises at least an inverter; and
    the switching device comprises the at least an inverter.

6. The system of claim 1, wherein:
    the at least a propulsor motor further comprises at least a winding; and
    the at least an inductor further comprises the at least a winding.

7. The system of claim 6, wherein the characteristic includes a current metric.

8. The system of claim 1, wherein the recharging connector is configured to:
    detect a characteristic of the power source received; and
    drive the switching device as a function of the detected characteristic.

9. The system of claim 1, wherein the recharging connector further comprises a coupling mechanism configured to couple the recharging connector to an external power source.

10. The system of claim 1, wherein:
    the at least a motor further comprises at least an inverter and at least a winding;
    the switching device comprises the at least an inverter; and
    the at least an inductor further comprises the at least a winding.

11. A method of recharging an electric vehicle, comprising:
    selecting an electric vehicle, wherein the electric vehicle comprises:
       one or more propulsor motors;
       a recharging connector;
       a power storage unit; and
       a power supply circuit, wherein the power supply circuit is in electric communication with the power storage unit, and the recharging connector using one or more busbar, wherein the power supply circuit further comprises a buck-boost regulator operating as a neutral connection switch configured to electrically connect one or more of the at least a propulsor motors, wherein the buck-boost regulator further comprises:
          at least an inductor; and
          a switching device to supply intermittent current to the at least an inductor, wherein the switching device is configured to perform a buck boost function; and
    receiving, at the recharging connector, a power source;
    converting, via the power supply circuit, the power source into a regulated power output; and
    storing, the regulated power output in the power storage unit.

12. The method of claim 11, wherein the electric vehicle includes an electric aircraft.

13. The method of claim 11, wherein the power source includes an unregulated power source.

14. The method of claim 11, wherein the power supply circuit further comprises:
    a load disconnect switch; and
    a neutral connection switch.

15. The method of claim 11, wherein:
    the electric vehicle comprises at least an inverter; and
    a switching device, wherein the switching device comprises the at least an inverter.

16. The method of claim 11, wherein:
    the at least a propulsor motor further comprises at least a winding; and
    at least an inductor further comprises the at least a winding.

17. The method of claim 16, wherein the characteristic includes a current metric.

18. The method of claim 11, wherein the recharging connector is configured to:
   detect a characteristic of the power source received; and
   drive the switching device a function of the detected characteristic.

19. The method of claim 11, wherein the recharging connector further comprises a coupling mechanism configured to couple the recharging connector to an external power source.

20. The method of claim 11, wherein:
   the at least a propulsor motor further comprises:
   at least an inverter and at least a winding;
   a switching device, wherein the switching device comprises the at least an inverter; and
   the at least an inductor further comprises the at least a winding.

* * * * *